April 12, 1927.
H. J. HOFF ET AL
1,624,243
VEHICLE WHEEL JACK
Filed March 2, 1926
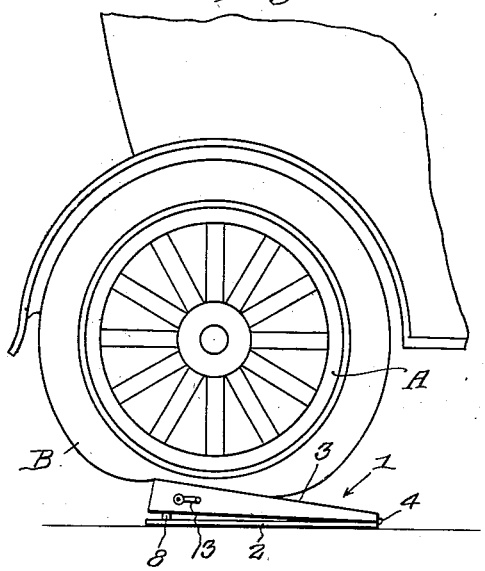
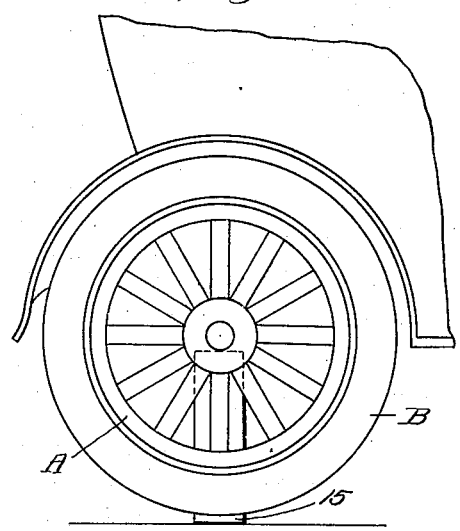
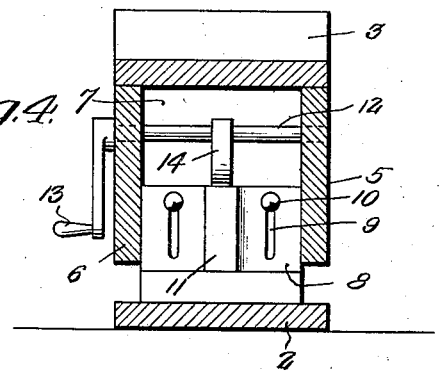
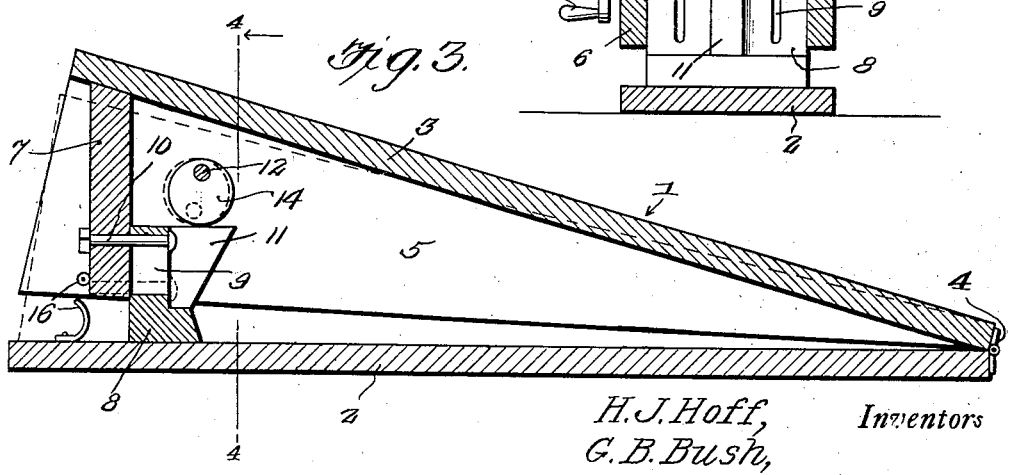
H. J. Hoff,
G. B. Bush, Inventors
By Clarence A. O'Brien
Attorney Patented Apr. 12, 1927.

1,624,243

UNITED STATES PATENT OFFICE.

HENRY J. HOFF AND GEORGE B. BUSH, OF YORK, PENNSYLVANIA.

VEHICLE-WHEEL JACK.

Application filed March 2, 1926. Serial No. 91,309.

The present invention relates to improvements in vehicle wheel jacks and has reference more particularly to a chock which includes an inclined runway onto which the wheel of the vehicle is run for elevating the wheel off of the ground, and after a suitable support is placed under the axle adjacent said wheel, the chock may be easily removed and the wheel or its tire is then readily accessible for removing the same.

One of the important objects of the present invention is to provide a vehicle jack which is particularly adapted for use in raising a vehicle wheel whose pneumatic tire has been deflated so that considerable time and labor will be saved in jacking up the wheel in order that the deflated tire may be readily and easily removed from the wheel.

A still further object is to provide a vehicle jack of the above mentioned character which includes a base, and inclined runway onto which one of the wheels of the vehicle is adapted to run, means being associated with the base and the runway for facilitating the raising and lowering of said runway.

A still further object is to provide a vehicle jack of the above mentioned character which is simple in construction, inexpensive, strong and durable and further well adapted to the purpose for which it is designed.

In the accompanying drawing forming a part of this application and in which like numerals designate like parts throughout the several views:

Figure 1 is a side elevation of the jack embodying our invention, showing the same in use.

Figure 2 is a side elevation of one of the rear wheels of a motor vehicle showing the same supported in an elevated position after the jack has been removed from beneath the wheel.

Figure 3 is a longitudinal sectional view through the jack showing the inclined runway in its raised position, and Figure 4 is a sectional view taken approximately on line 4—4 of Figure 3 looking in the direction of the arrows.

In the drawing wherein for the purpose of illustration is shown the preferred embodiment of our invention, the numeral 1 designates generally our improved vehicle jack or chock, the same comprising the base 2. A rearwardly inclined runway 3 onto which the wheel of the vehicle which is to be raised off of the ground is run is hingedly secured at its forward end on the forward end of the base 2 as illustrated at 4. A pair of side walls 5 and 6 respectively have their upper edges secured to the underside of the runway 3 adjacent the respective longitudinal side edges thereof, the lower edges of the side walls being adapted to lie flush on the upper face of the base 2 when the runway is in its lowermost position. As is clearly illustrated in Figures 1 and 3 of the drawing, these side walls are substantially triangular in shape whereby the inclined runway is provided.

For the purpose of facilitating the raising and lowering of the rear upwardly inclined portion of the runway and for further holding the runway in its raised position, we provide the vertical wall 7, the same being secured between the side walls 5 and 6 adjacent the rear ends thereof, the upper edge of this wall being beveled to fit against the bottom of the runway and the lower edge of the vertical wall lies flush with the lower edges of the side walls. This construction is clearly shown in Figure 3 of the drawing. Coacting with the inner face of the lower portion of the vertical wall 7 is the angular block 8.

The vertical portion of this block is provided with a pair of longitudinally extending slots such as are shown at 9, and extending through these slots are the bolts 10 which bolts extend transversely through the lower portion of the vertical wall 7. In this manner, the block 8 will be adapted for vertical slidable movement between the side walls 5 and 6 wherein the purpose of the provision of the slidable block 8 will be presently apparent.

A shoulder or lug 11 extends forwardly from the intermediate portion of the vertical portion of the angular block 8 and the upper face of this shoulder or lug lies substantially flush with the upper edge of the vertical portion of the block as is also clearly shown in Figures 3 and 4.

A shaft 12 extends transversely through the side walls 5 and 6, and one end of the shaft extends outwardly of the side walls 6 to accommodate an actuating handle 13. A cam 14 is fixedly secured on the intermediate portion of the rotatable shaft 12 and this cam is adapted for cooperation with the upper face of the shoulder or lug 11 for holding the block 8 in its lowermost position in the manner to be more fully described.

In use, the handle 13 is actuated so as to rotate the shaft 12 and simultaneously operate the cam 14 so that the same will cooperate with the shoulder or lug 11 in forcing the slidable block 8 downwardly so that the bottom thereof will engage the upper face of the base 2.

With the parts arranged as shown in Figure 3 of the drawing, the inclined runway 3 will be raised so that the lower edges of the side walls 5 and 6 which are carried by the inclined runway will raise out of engagement with the base and the upper ends of the slots 9 formed in the vertical portion of the block 8 will engage the bolts 10. The jack or chock is then placed on the ground at a point directly rearwardly of the vehicle wheel which is to be raised to facilitate the removal of the deflated tire. The vehicle is then operated so as to cause the wheel to be run onto the inclined runway.

When the jack is positioned beneath the deflated tire of the vehicle wheel in the manner shown in Figure 1, the wheel A is raised and held out of engagement with the ground and then a suitable block or jack such as is shown at 15 in Figure 2 of the drawing is placed underneath of the axle adjacent the wheel, and when this block is in proper position, our improved jack may then be removed from beneath the deflated tire B by rotating the shaft 12 so that the cam 14 is moved out of engagement with shoulder or lug 11, and the weight of the wheel on the inclined runway 3 will cause the same to move downwardly so that the lower edges of the side walls 5 and 6 will come in contact with the upper face of the base 2. The jack 1 may then be easily slid from beneath the wheel, and the wheel will still be held in a raised position by the jack member 15 in the manner as clearly illustrated in Figure 2, and thus permit the deflated tire to be readily removed from the wheel in the usual manner.

The provision of a vehicle jack or chock of the above mentioned character will save considerable time and labor in raising a vehicle wheel whenever it becomes necessary, and furthermore our improved jack is of such construction as to prevent any possibility of the same being tilted when in use.

The free end portion of the runway may be secured to the adjacent portion of the base 2 when the jack is not in use by any suitable locking means such as is shown generally at 16.

Our improved jack is of such construction as to enable the same to be carried in any convenient place or compartment in the motor vehicle and will at all times be positive and efficient in carrying out the purposes for which the same is designed.

While we have shown the preferred embodiment of our invention it is to be understood that minor changes in the size, shape, and arrangement of parts may be resorted to without departing from the spirit of the invention and the scope of the appended claims.

Having thus described the invention, what we claim as new and desire to secure by Letters Patent is:—

1. A vehicle wheel jack comprising a base, a rearwardly inclined runway hingedly secured at its forward end on said base, vertical side walls secured to said runway, a vertical wall secured between said side walls adjacent the rear ends thereof, the lower edge of said vertical wall being disposed flush with the lower edges of the side walls, a block adapted for slidable movement on the inner face of the vertical wall between said side walls, and means for moving said block downwardly into engagement with said base whereby the inclined runway may be held in its raised position.

2. A vehicle wheel jack comprising a base, a rearwardly inclined runway hingedly secured at its forward end on said base, vertical side walls secured to said runway, a vertical wall secured between said side walls adjacent the rear ends thereof, the lower edge of said vertical wall being disposed flush with the lower edges of the side walls, a block adapted for slidable movement on the inner face of the vertical wall between said side walls, and means for moving said block downwardly into engagement with said base whereby the inclined runway may be held in its raised position, said last mentioned means comprising a shaft extending transversely between the side walls of the runway, one end of said shaft extending beyond the adjacent side wall, an operating handle secured thereon, and a cam fixedly secured to the intermediate portion of the shaft and adapted for cooperation with the top of said slidable block.

3. A vehicle jack comprising a base, an inclined runway onto which the wheel which is to be raised is to be run, said runway being hingedly secured at its forward end on the forward end of the base, a pair of side walls secured to said runway, a block adapted for vertical slidable movement between the side walls, a rotatable shaft journaled transversely through the side walls, and a cam on the intermediate portion of said shaft and adapted for cooperation with said block whereby the block may be moved downwardly into engagement with said base to effect the raising of said runway.

4. A vehicle wheel jack comprising a base, a rearwardly inclined runway hingedly secured at its forward end on said base, side walls extending downwardly from the runway, a vertical wall secured between said side walls adjacent the rear ends thereof, a block having longitudinal slots formed therein, bolts carried by said vertical wall and extending through said slots whereby said block is adapted for vertical slidable movement adjacent one side of the vertical wall, a rotatable shaft journaled transversely through the side walls, an operating handle on one end of said shaft, and a cam on the intermediate portion of the shaft in cooperation with the upper portion of the block for moving the same downwardly into engagement with said base whereby the side walls and the inclined runway are held in a raised position.

In testimony whereof we affix our signatures.

HENRY J. HOFF.
GEORGE B. BUSH.